United States Patent
Sivasankaran et al.

(10) Patent No.: US 7,512,146 B1
(45) Date of Patent: Mar. 31, 2009

(54) METHOD AND APPARATUS FOR LAYER 2 MULTICAST TRAFFIC MANAGEMENT

(75) Inventors: Dileep Sivasankaran, Fremont, CA (US); Frank S. Madren, Los Gatos, CA (US); Rajeev Garg, Fremont, CA (US)

(73) Assignee: Garrettcom, Inc., Fremont, CA (US)

( * ) Notice: Subject to any disclaimer, the term of this patent is extended or adjusted under 35 U.S.C. 154(b) by 0 days.

(21) Appl. No.: 11/431,735

(22) Filed: May 10, 2006

Related U.S. Application Data

(60) Provisional application No. 60/763,569, filed on Jan. 31, 2006.

(51) Int. Cl.
*H04L 12/56* (2006.01)
*H04J 1/16* (2006.01)

(52) U.S. Cl. .................... 370/432; 370/390; 370/252

(58) Field of Classification Search ............ 370/395.53, 370/390, 432, 389, 229, 386, 400, 252, 238; 725/148; 709/238, 226, 224
See application file for complete search history.

(56) References Cited

U.S. PATENT DOCUMENTS

| | | | |
|---|---|---|---|
| 6,512,766 B2 | 1/2003 | Wilford ...................... 370/389 |
| 6,654,371 B1 | 11/2003 | Dunstan et al. ............. 370/390 |
| 6,785,294 B1 | 8/2004 | Ammitzbøll et al. ........ 370/467 |
| 6,847,638 B1 | 1/2005 | Wu et al. .................... 370/389 |
| 6,977,891 B1 | 12/2005 | Ranjan et al. ............... 370/229 |
| 7,061,880 B2 | 6/2006 | Basilier ...................... 370/312 |
| 2002/0120769 A1* | 8/2002 | Ammitzboell .............. 709/238 |
| 2005/0080901 A1* | 4/2005 | Reader ....................... 709/226 |
| 2005/0249233 A1* | 11/2005 | Akaba et al. ................ 370/432 |
| 2006/0015928 A1* | 1/2006 | Setty et al. .................. 725/148 |
| 2006/0146857 A1* | 7/2006 | Naik et al. .................. 370/432 |
| 2006/0190589 A1* | 8/2006 | Parker ........................ 709/224 |

* cited by examiner

*Primary Examiner*—John Pezzlo
(74) *Attorney, Agent, or Firm*—Okamoto & Benedicto LLP

(57) ABSTRACT

One embodiment pertains to a switching device which is configured to provide multicast traffic management in a layer 2 network without layer 3 devices A specific embodiment relates to a method of implementing IGMP multicasting in a layer 2 network. IGMP packets are snooped by multiple switches in the layer 2 network. IGMP query messages are generated by each of the multiple switches. IGMP join report messages are forwarded by each of the multiple switches to all ports on which a querier is present. Other embodiments are also disclosed.

14 Claims, 11 Drawing Sheets

Receiver Engine

```
While Forever
{
        receiveIgmp();
        if(pktType == Query)
        {
                if(NOT L2Mode)
                {
                        update otherQuerierPresent;
                        if(otherQuerierPresent == this querier)
                        {
                                forwardto all port;
                                update querierPort;
                        }
                }else update querierPort;
        }
        else if(pktType == JoinReport)
        {
                update GroupInfo;
                if(NOT L2Mode)
                {
                        add querierPort to GroupInfo)
                }
                for(all ports)
                {
                        if(chkFwdTimer(port,group)) forwardto port;
                }
        }
}
```

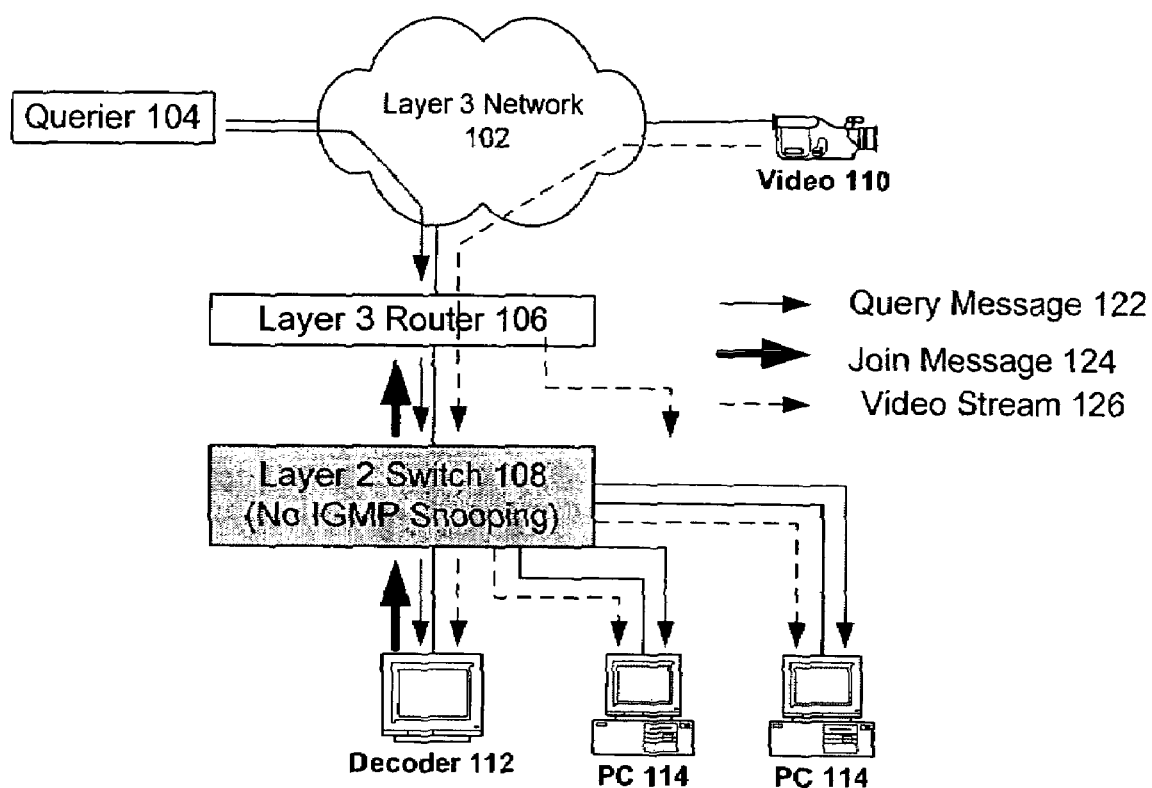
FIG. 1
(Conventional)

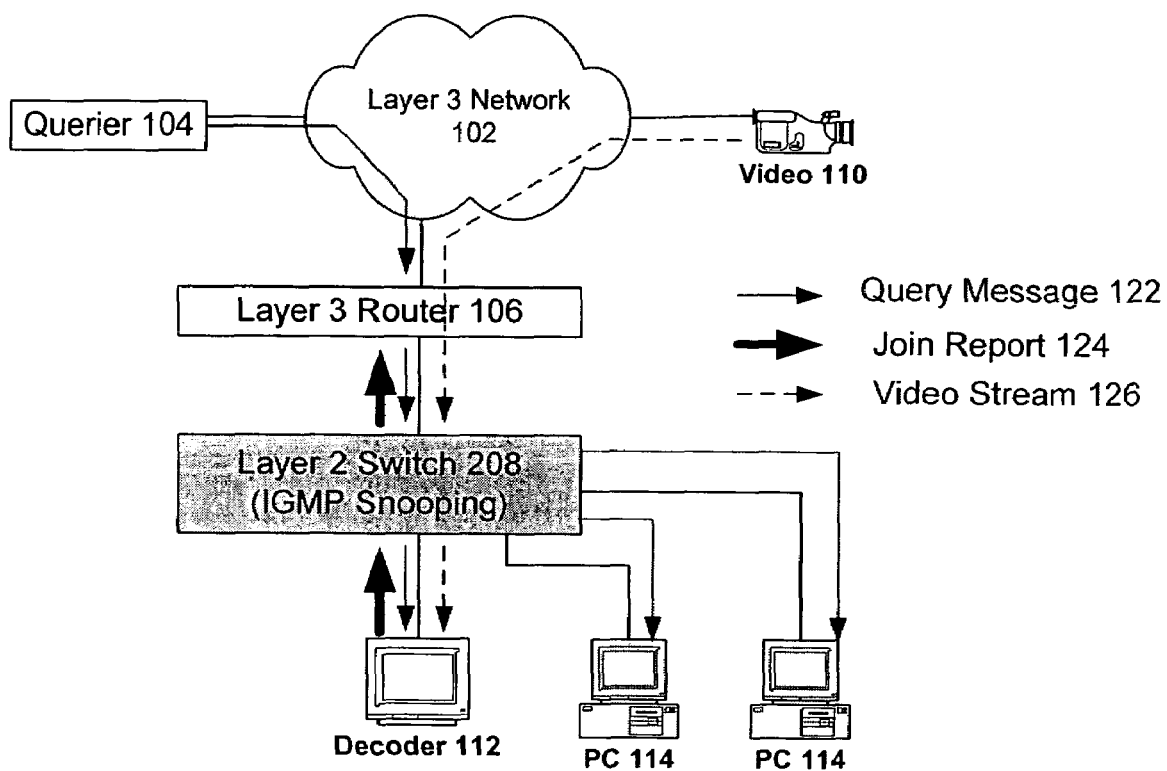
FIG. 2A
(Conventional)

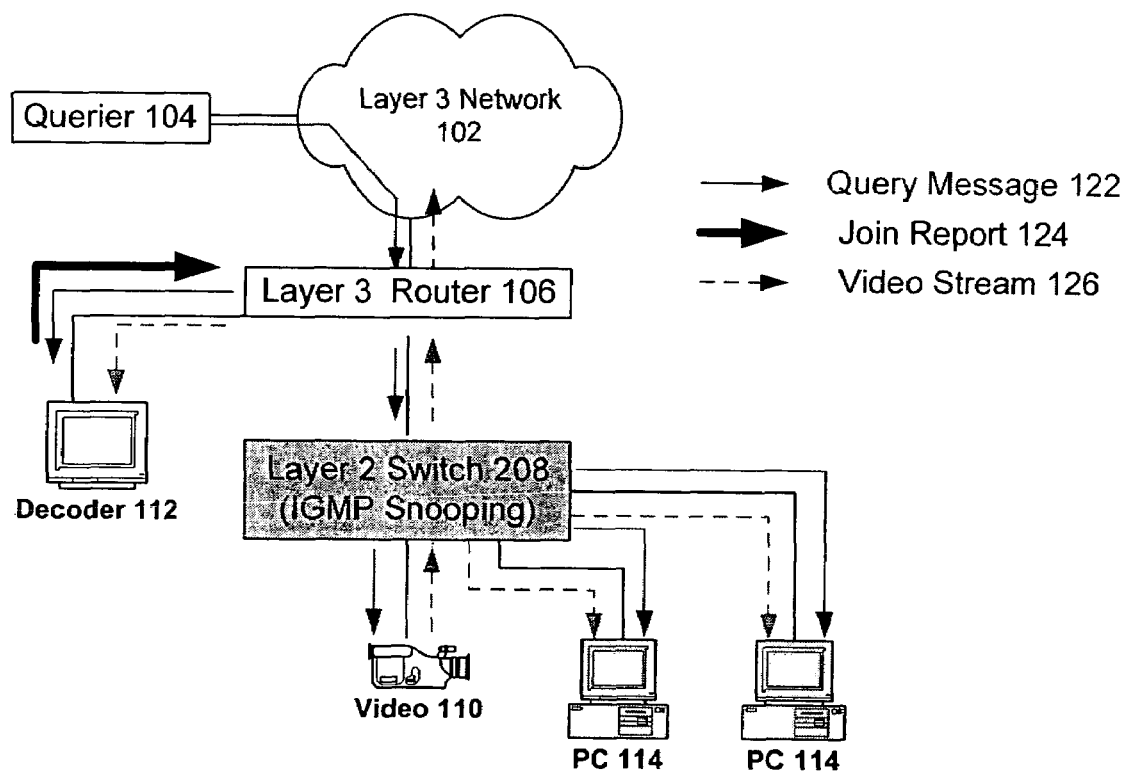
FIG. 2B
(Conventional)

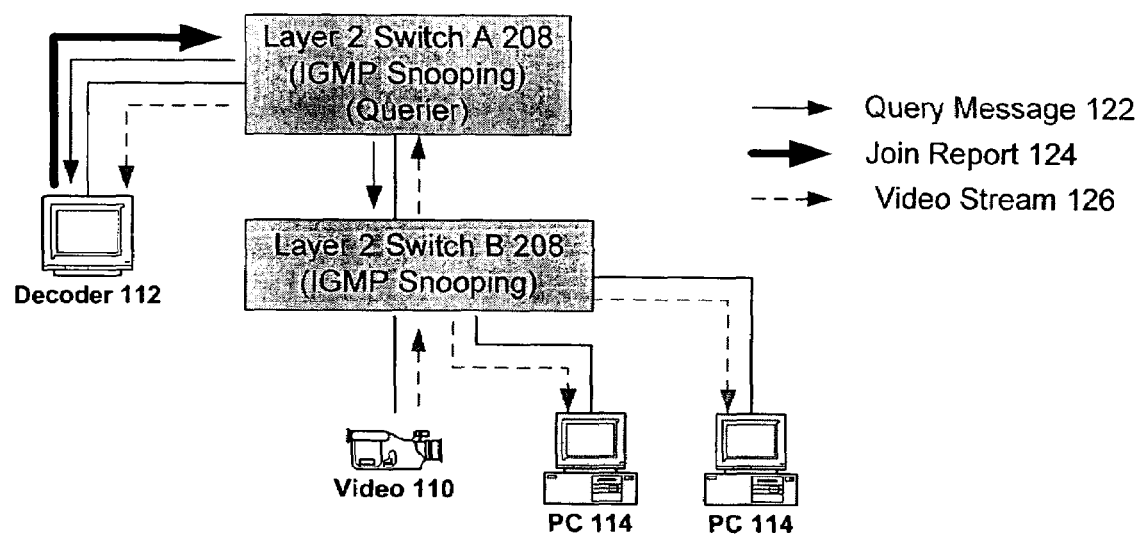
FIG. 3A
(Conventional)

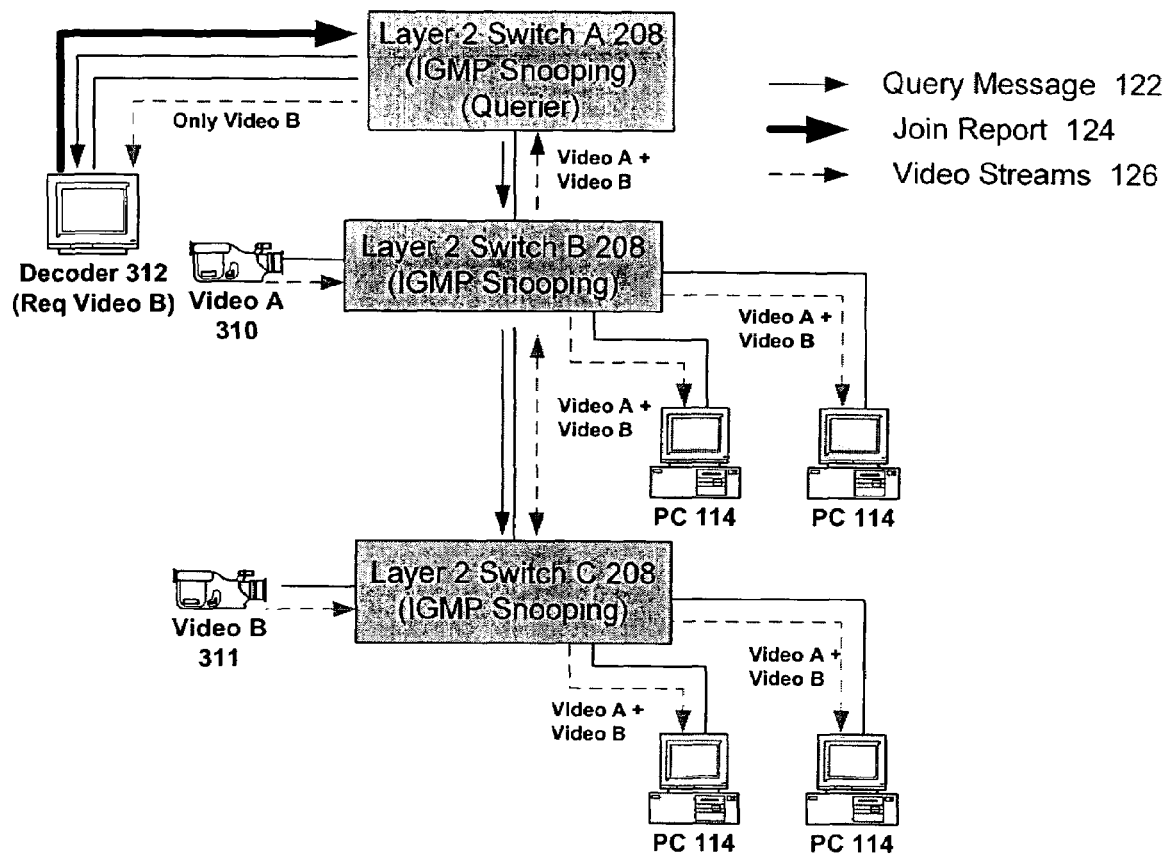
FIG. 3B
(Conventional)

Querier Engine

```
While Forever
{
        cycle QueryTimer;
        If (NOT QueryTimer Expired) continue;
        If (L2Mode OR NOT otherQuerierPresent)
        {
                sendQuery(all ports);
        }
}
```

FIG. 5A

Receiver Engine

```
While Forever
{
        receiveIgmp();
        if(pktType == Query)
        {
                if(NOT L2Mode)
                {
                        update otherQuerierPresent;
                        if(otherQuerierPresent == this querier)
                        {
                                forwardto all port;
                                update querierPort;
                        }
                }else update querierPort;
        }
        else if(pktType == JoinReport)
        {
                update GroupInfo;
                if(NOT L2Mode)
                {
                        add querierPort to GroupInfo)
                }
                for(all ports)
                {
                        if(chkFwdTimer(port,group)) forwardto port;
                }
        }
}
```

FIG. 5B

METHOD AND APPARATUS FOR LAYER 2 MULTICAST TRAFFIC MANAGEMENT

CROSS-REFERENCE TO RELATED APPLICATIONS

The present application claims the benefit of U.S. provisional patent application No. 60/763,569, filed Jan. 31, 2006, by inventors Dileep Sivasankaran, Frank S. Madren, and Rajeev Garg, entitled "Method and Apparatus for Layer 2 Multicast Traffic Management," the disclosure of which is hereby incorporated by reference.

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present application relates generally to communications and networking. More particularly, the present application relates to multicasting in networks.

2. Description of the Background Art

Internet Protocol (IP) multicasting is an efficient technique for directing the same information packets to multiple receiving hosts. In comparison, unicasting sends a separate copy to each individual destination and is hence often much less efficient. Broadcasting differs from multicasting in that all hosts in a network receive and process broadcast traffic, while multicast traffic is, at least in theory, only received and processed by a controlled group of receivers.

Internet Group Management Protocol (IGMP) is a protocol of the Internet Protocol (IP) suite. IGMP may be utilized to control and limit the flow of multicast traffic through an IP network.

IGMP utilizes multicast "queriers" and hosts that support IGMP. A querier is a network device which transmits the queries and is typically a router. Queriers and IGMP hosts communicate with each other "query", "report" and "leave group" messages. A query message is sent by a querier device to discover which network devices are members of a specified multicast group. A report message is sent by a host in response to a query to indicate a host's membership in the specified multicast group. A leave group message is sent by a host so as to remove itself from a multicast group.

SUMMARY

One embodiment of the invention pertains to a switching device which is configured to provide multicast traffic management in a layer 2 network without layer 3 devices. The switching device may communicate multicast group information with other switches in the layer 2 network by way of a query-response protocol. Alternatively, the switching device may communicate multicast group information with other switches in the layer 2 network by way of peer-to-peer protocol, a discovery protocol, or a tracer protocol.

A specific embodiment relates to a method of implementing IGMP multicasting in a layer 2 network. IGMP packets are snooped by multiple switches in the layer 2 network. IGMP query messages are generated by each of the multiple switches. IGMP join report messages are forwarded by each of the multiple switches to all ports on which a querier is present.

Another specific embodiment relates to a switching apparatus configured to implement IGMP multicasting in a layer 2 network. The apparatus includes means for snooping IGMP packets. Processor-executable instructions are configured to generate IGMP query messages. Further processor-executable instructions are configured to forward IGMP join report messages to all ports on which a querier is present.

Other embodiments are also disclosed.

BRIEF DESCRIPTION OF THE DRAWINGS

FIG. 1 depicts multicasting in an example conventional network having a layer 3 router and a layer 2 switch without IGMP snooping.

FIG. 2A and FIG. 2B depicts multicasting in example conventional networks having a layer 3 router and a layer 2 switch with IGMP snooping.

FIGS. 3A and 3B depict multicasting in example conventional networks made up of layer 2 switches with IGMP snooping.

FIG. 5A shows example pseudo-code for a querier engine to implement the L2 multicast mode therein in accordance with an embodiment of the invention.

FIG. 5B shows example pseudo-code for a receiver engine to implement the L2 multicast mode therein in accordance with an embodiment of the invention.

DETAILED DESCRIPTION

Figure 4:
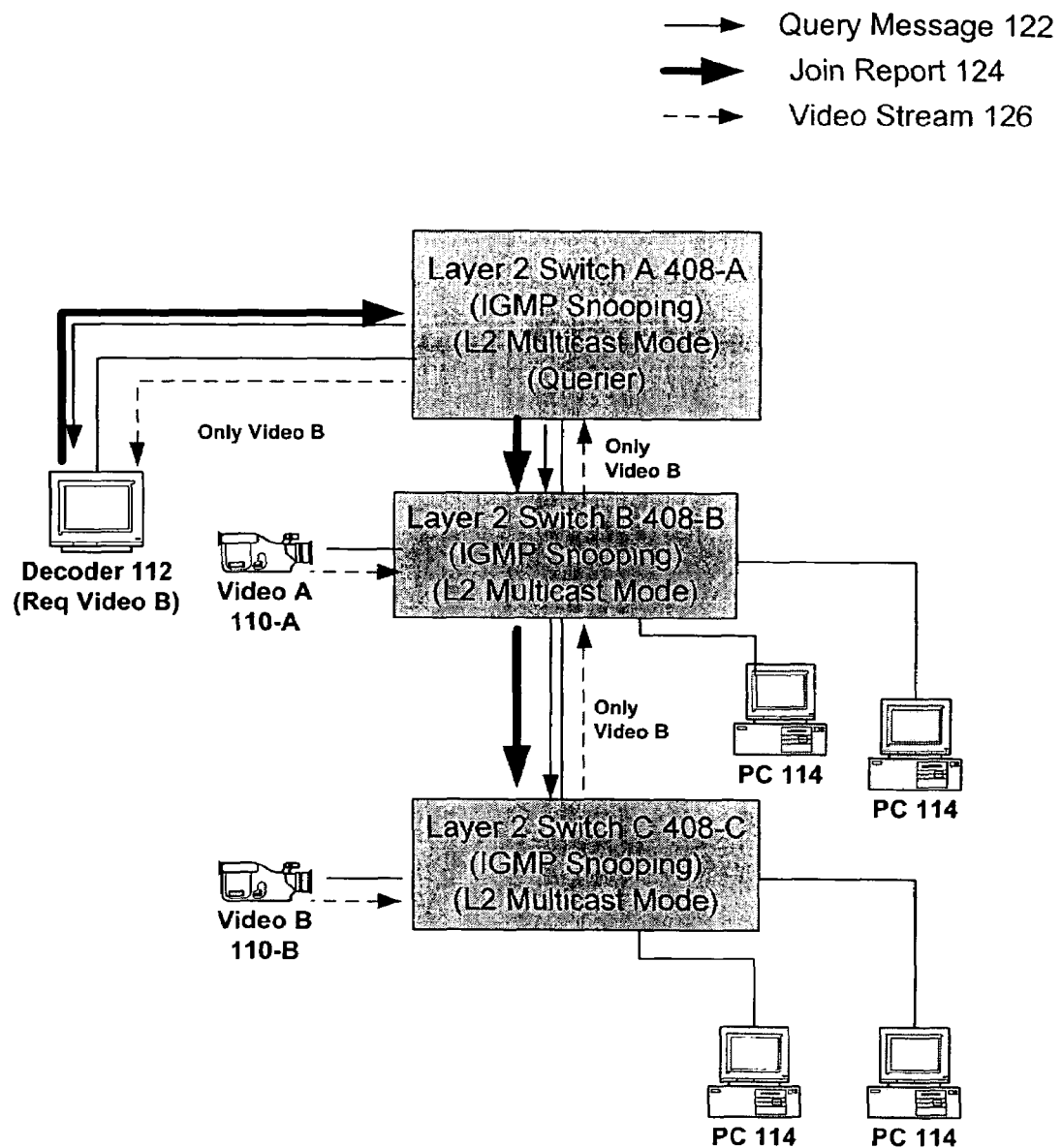
FIG. 4 depicts multicasting in a network including layer 2 switches operating in a L2 multicast mode in accordance with an embodiment of the invention.

Problems with Conventional IGMP and IGMP Snoopinq

FIG. 1 depicts multicasting in an example conventional network having a layer 3 router 106 and a layer 2 switch 108 without IGMP snooping. In this example network, the querier device 104 and the multicast vsource 110 are coupled to the layer 3 router 106 by way of a layer 3 (for example, IP) network 102. Here, the multicast source 110 is a video source which outputs a video stream 126. A video decoder 122 which is to receive the multicast video stream 126 is on the layer 2 switch 108.

As depicted, the querier device 104 sends a query message 122 to discover the members of a multicast group. After being forwarded by the router 106, the query message 122 is received by the video decoder 112 (and by the PCs 114).

The video decoder 112 responds to the query message 122 by sending a join report message 124 to the router 106. The router 106 communicates the group membership information to the querier 104 and to the other routers in the layer 3 network 102. The routers 106 of the layer 3 network each maintains and updates IP multicast forwarding tables to reflect the IGMP membership information.

The multicast video stream 126 is routed from the source (video 110) to the layer 3 router 106. The router 106 has a multicast forwarding table indicating that the port leading to the layer 2 switch 108 belongs to the specified multicast group, and hence the router 106 sends the packets of the video stream 126 to the port leading to the layer 2 switch 108.

Here, the layer 2 switch 108 does not have IGMP snooping. As such, the switch 108 does not know which output ports lead to members of the multicast group and which do not, so the packets of the multicast video stream 126 are broadcast by the switch 108 from each of its output ports. Hence, the decoder 112 receives the video stream 126, but so do the other hosts (for example, personal computers 114) who are not members of the multicast group. Thus, the configuration of FIG. 1 results in unnecessary traffic and processing.

FIG. 2A depicts multicasting in an example conventional network having a layer 3 router 106 and a layer 2 switch with IGMP snooping 208. In FIG. 2A, the multicast source (video 110) is on the layer 3 network 102, and the receiver (decoder 112) is on the layer 2 switch 208 which is connected through an uplink with that routed network 102.

Again, the querier device 104 sends a query message 122 to discover the members of a multicast group. After being forwarded by the router 106, the query message 122 is received by the video decoder 112 (and by the PCs 114).

The video decoder 112 responds to the query message 122 by sending a join report message 124 via the layer 2 switch 208 to the router 106. The router 106 communicates the group membership information to the querier 104 and to the other routers in the layer 3 network 102. The routers 106 of the layer 3 network each maintains and updates IP multicast forwarding tables to reflect the IGMP membership information. Since the layer 2 switch 208 has IGMP snooping, the switch 208 sees the join message 124, and it forms a corresponding multicast group.

The multicast video stream 126 is routed from the source (video 110) to the layer 3 router 106. The router 106 has a multicast forwarding table indicating that the port leading to the layer 2 switch 208 belongs to the specified multicast group, and hence the router 106 sends the video stream packets to the port leading to the layer 2 switch 208.

Here, the layer 2 switch 208 has formed a corresponding multicast group and knows which output ports lead to members of the multicast group and which do not. In effect, the packets of the multicast video stream 126 are transmitted by the switch 208 only from an output port if an appropriate join message 124 was received from that port. Hence, the decoder 112 receives the video stream 126, but the other hosts (for example, personal computers 114) who are not members of the multicast group do not receive the video stream 126.

Now consider FIG. 2B. FIG. 2B depicts multicasting in another example conventional network having a layer 3 router 106 and a layer 2 switch 208 with IGMP snooping. However, in FIG. 2B, the multicast source (video 110) is coupled to a port of the layer 2 switch 208, and the receiver (decoder 112) is reached via the layer 3 router 106 connected to the layer 2 switch 208.

Again, the querier device 104 sends a query message 122 to discover the members of a multicast group. After being forwarded by the router 106, the query message 122 is received by the video decoder 112 and by the hosts coupled to the layer 2 switch 208.

In this case, the decoder 112 sends a join report message 124 to the router 106 in response to the query message 122. The router 106 communicates the group membership information to the querier 104 and to the other routers in the layer 3 network 102. The routers 106 of the layer 3 network each maintains and updates IP multicast forwarding tables to reflect the IGMP membership information. Unfortunately, in this case, the join message 124 does not pass from the layer 3 router 106 to the layer 2 switch 208. Hence, no corresponding IGMP group is formed by the layer 2 switch 208.

As such, when the multicast video stream 126 is received by the layer 2 switch 208, the switch 208 proceeds to broadcast the stream 126 via all of its ports. Hence, the decoder 112 receives the video stream 126, but so do the other hosts (for example, personal computers 114) on the switch 208 who are not members of the multicast group. Thus, like the configuration of FIG. 1, the configuration of FIG. 2B results in unnecessary traffic and processing.

FIGS. 3A and 3B depict multicasting in example conventional networks made up of layer 2 switches with IGMP snooping. FIG. 3A shows a network with one multicast source. FIG. 3B shows a network with multiple multicast sources.

In FIG. 3A, the multicast source (video 110) is coupled to a port of layer 2 switch (Switch B) 208, and the receiver (decoder 112) is reached via a different layer 2 switch (Switch A) 208 which is also the querier device.

The querier device (Switch A) sends a query message 122 to discover the members of a multicast group. The query message 122 is broadcast to all the devices attached to both switches. Note that the query messages 122 from Switch B to the hosts connected thereto are implied, rather than being shown explicitly, in FIG. 3A.

In this case, the decoder 112 sends a join report message 124 to the querier (Switch A) in response to the query message 122. Unfortunately, in this case, the join message 124 is not seen by Switch B. Hence, Switch B does not form a corresponding multicast group.

As such, when the multicast video stream 126 is received by the Switch B, Switch B proceeds to broadcast the stream 126 via all of its ports. Switch A and subsequently the decoder 112 receive the video stream 126, but so do the other hosts (for example, personal computers 114) on Switch B who are not members of the multicast group. Thus, the layer 2 configuration of FIG. 3A results in unnecessary traffic and processing.

In FIG. 3B, the multicast sources (video A 310 and video B 311) are each coupled to a port of a switch 208 (Switch B and Switch C, respectively), and the receiver (decoder 312) is reached via a different layer 2 switch 208 (Switch A) which also functions as the querier device.

The querier device (Switch A) sends a query message 122 to discover the members of a multicast group. The query message 122 is broadcast to all the devices attached to all three switches 208. Note that the query messages 122 from Switches B and C to the hosts connected thereto are implied, rather than being shown explicitly, in FIG. 3B.

In this case, the decoder 312 sends a join report message 124 to the querier (Switch A) in response to the query message 122. Here, the decoder 312 joins the multicast group for video B 311, but does not join the multicast group for video A 310. Unfortunately, the IGMP membership information does not pass from Switch A either to Switch B or Switch C. Hence, Switches B and C do not receive information as to which of its ports belong to either IGMP group.

When Switch A receives the multicast video streams (A and B), it knows by way of its IGMP snooping that the decoder 312 only joined the multicast group for video stream B. Hence, Switch A may transmit only video stream B to the decoder 312.

However, when the multicast video streams (A and B) are received by Switches B and C, these switches proceed to broadcast both streams via all of its ports. This is because IGMP snooping depends upon the IGMP queries and responses. In this case, while Switches B and C do get the query messages 122, they do not see any join message 124. As such, no multicast group is created on Switches B and C, and hence no pruning of the multicasts is performed by these switches.

As discussed above, in the configuration of FIG. 3B, there is much unnecessary traffic and processing. Such unnecessary traffic and processing is substantially reduced by providing a layer 2 multicast mode (L2 multicast mode) for the layer 2 switches in accordance with an embodiment of the invention.

L2 Multicast Mode

FIG. 4 depicts multicasting in a network 400 including layer 2 switches 408 operating in a L2 multicast mode in accordance with an embodiment of the invention. Each switch 408 has IGMP snooping, and each switch 408 also operates in the L2 multicast mode. The IGMP snooping may be implemented with circuitry and/or software code.

Each switch 408 in the L2 multicast mode generates IGMP query messages 122 on a frequent basis. In addition, each switch 408 in the L2 multicast mode forwards IGMP join report messages 124.

With the aforementioned query generation and join forwarding, each switch 408 in the layer 2 network 400 sees join report messages 124 from hosts throughout the network 400. Since each switch 408 sees the join reports 408, each switch 408 is able to form the associated multicast groups. In other words, multicast group membership information becomes spread throughout the layer 2 network 400.

Each switch 408 in the L2 multicast mode also prunes all multicasts by default. As such, a multicast packet is forwarded only if a group is available, and only to the member ports of the group.

In the diagram of FIG. 4, consider the scenario where the decoder 112 requests only video B (i.e. joins the multicast group for video B, but not for video A). The join message 124 from the decoder 112 is forwarded from Switch A to Switches B and C.

The video stream B is received from the source 110-B by Switch C. The output port of Switch C that goes to Switch B is a member port of the multicast group for video B. As such, the packets of video stream B are forwarded out that port from Switch C to Switch B. Similarly, the output port of Switch B that goes to Switch A is a member port of the multicast group for video B. As such, the packets of video stream B are forwarded out that port from Switch B to Switch A. Lastly, the output port of Switch A that goes to decoder 112 is a member port of the multicast group for video B. As such, the packets of video stream B are forwarded out that port from Switch A to the decoder 112.

The other hosts 114 which did not join the multicast group for video B do not needlessly receive the packets of video stream B. Moreover, as each switch 408 defaults to pruning the multicast, and no host joined the multicast group for video A, packets for video A are not forwarded by Switch B. These features result in a substantial reduction of unnecessary traffic and processing in the network 400.

In accordance with a specific embodiment of the invention, L2 multicast mode may be defined with the following rules. 1) A multicast will be forwarded only to the ports that ask for it. 2) Join reports will be forwarded to all ports on which a querier is present. 3) Multicasts will not be automatically forwarded to querier ports. 4) Every switch will generate queries. 5) Switches will not forward queries. 6) Leave messages will be forwarded only if no querier port is a member. Other embodiments may implement rules with similar effect.

FIG. 5A shows example pseudo-code for a querier engine to implement the L2 multicast mode therein in accordance with an embodiment of the invention. Such a control loop for a querier engine may be implemented on each switch 408 capable of L2 multicast mode.

According to this control loop, if L2 multicast mode [L2Mode] is active, then whenever a query timer [QueryTimer] expires, an IGMP query message 122 is sent out of all ports by the switch 408.

If L2 multicast mode is not active, then the switch 408 sends out an IGMP query message 122 out of all ports only when no other querier is present that is more "qualified" to be a querier. Each switch will generally be capable of being a querier and will monitor received queries. Typically, if a switch sees a query from another switch with a lower IP address, it will set the "otherQuerierPresent flag and stop querying. If the switch sees a query from another switch with a higher IP address, that is ignored because this switch is more qualified to be the querier than the other one.

FIG. 5B shows example pseudo-code for a receiver engine to implement the L2 multicast mode therein in accordance with an embodiment of the invention. Such a control loop for a receiver engine may be implemented on each switch 408 capable of L2 multicast mode.

According to this control loop, an IGMP packet received [receiveIgmp( )] is checked to see if it is a query message. For a query message, if L2 multicast mode is not active [if (NOT L2Mode)], then the switch 408 basically forwards the query message to all output ports [forwardto all port] and updates a port map of queriers [update querierPort]. If L2 multicast mode is active, then the switch 408 updates a port map of queriers, but it does not have to forward the query message to all output ports.

Further according to this control loop, an IGMP packet received is checked to see if it is a join report message (pktType==JoinReport). For a join report message, the switch 408 updates the port map and other information for the associated multicast group [update GroupInfo]. If L2 multicast mode is not active, then the switch 408 also adds the querier port information to the multicast group information [add querierPort to GroupInfo]. Whether or not in L2 multicast mode, the switch 408 periodically forwards the join message to all of its output ports [if (chkFwdTimer(port,group)) forwardto port].

Note that the pseudo-code control loops shown in FIGS. 5A and 5B are given as illustrative examples. Actual implementation of L2 multicast mode in switches with IGMP snooping may vary depending on the specific implementation.

Regarding leave messages, there may be multiple hosts connected to a switch which are members of a specific multicast group and hence each receiving the packets for this group. When one of these hosts wants to leave the group, it sends a leave report. In this case, the switch does not forward the leave report to the uplink, because there are other hosts which are still members of the group. However, when no other host on the switch is a member, then the switch forwards the leave report to the uplink.

Under L2 multicast mode, querier ports may also be members of a multicast group. Hence, a switch under L2 multicast mode is configured so as to check both host ports and querier ports for group membership before deciding whether to a leave report should be forwarded.

For example, consider a switch having ports A, B, and C, where both ports A and B are querier ports, and port C is a host port. Consider that port C is a member of a specific multicast group, and a leave message is received via port C to leave that group. If both ports A and B are also members of that multicast group, then the leave message will not be forwarded. If port A is a member but port B is not, then the leave message will be forwarded only to port A, not to port B. If both ports A and B are not members, then the leave message is forwarded to both ports A and B.

Figure 6:
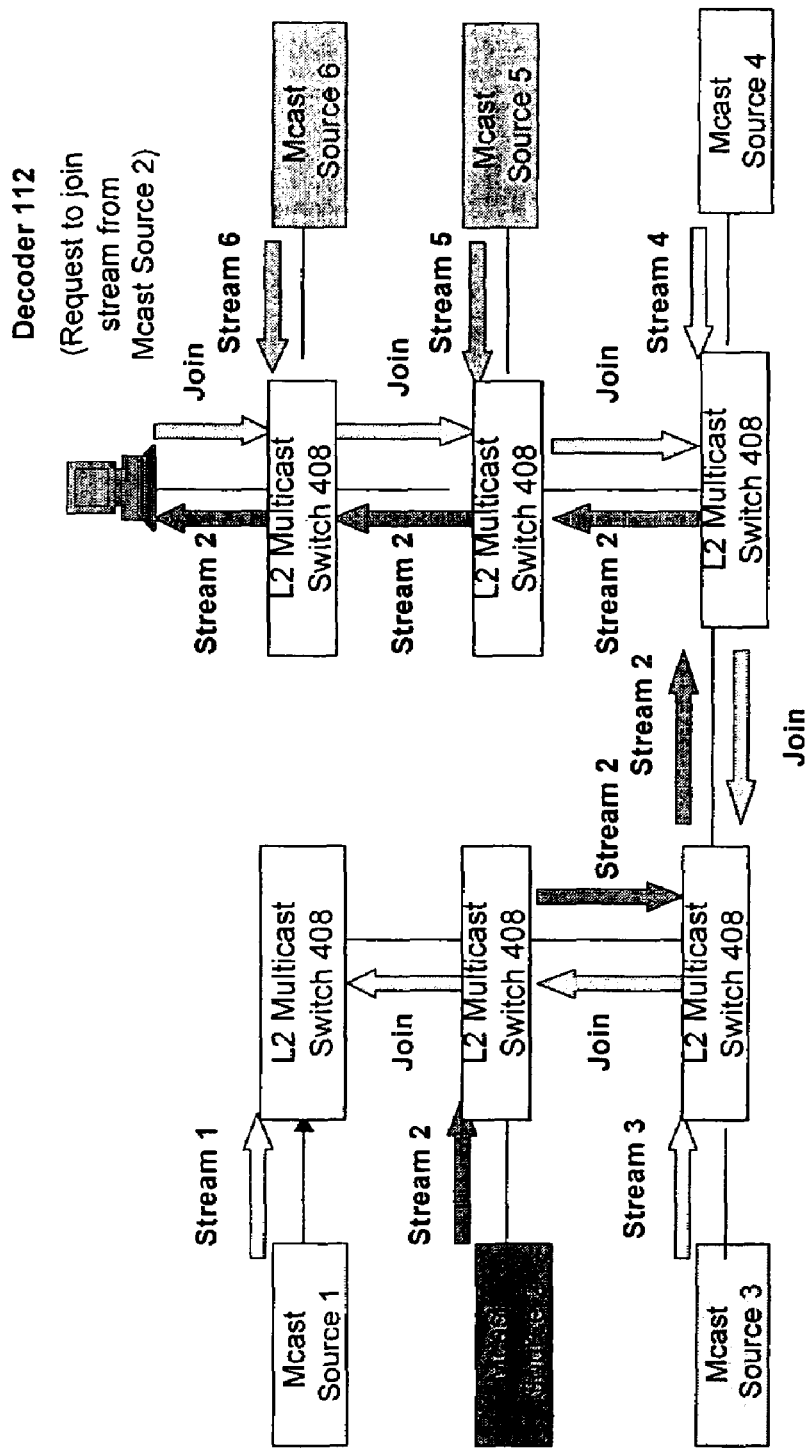
FIG. 6 depicts multicasting in a chain network including layer 2 switches operating in a L2 multicast mode in accordance with an embodiment of the invention.

FIG. 6 depicts multicasting in a chain network including layer 2 switches operating in a L2 multicast mode in accordance with an embodiment of the invention. In the chain network 602 such as that shown in FIG. 6, the multicasting is efficient regardless of the position of the decoder. This is because group membership is spread throughout the layer 2 network.

For example, consider the case where the decoder is connected as illustrated in FIG. 6 and requests only video from multicast (Mcast) source 2. The join message gets forwarded to all the chain switches in the network running L2 multicast mode. Once the switch connected directly to Mcast source 2 sees a join report, the switch forwards the requested multicast packets towards the switch originating the join report. Advantageously, only the requested video stream (Stream 2) is forwarded, and pruning of unnecessary streams substantially reduces traffic.

Figure 7:
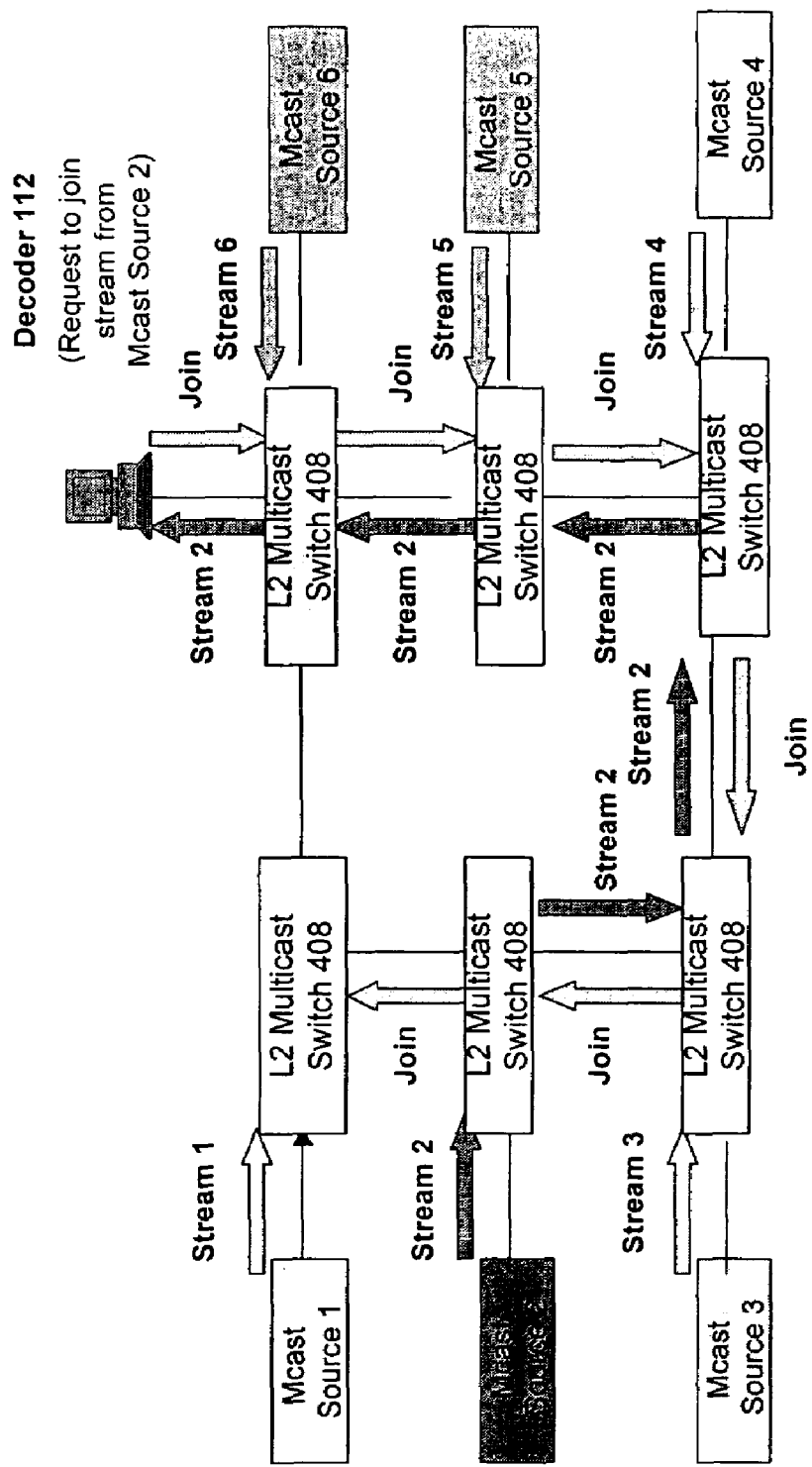
FIG. 7 depicts multicasting in a redundant ring network including layer 2 switches operating in a L2 multicast mode in accordance with an embodiment of the invention.

FIG. 7 depicts multicasting in a redundant ring network including layer 2 switches 408 operating in a L2 multicast mode in accordance with an embodiment of the invention. Similar to the chain network 602 of FIG. 6, the ring network 702 of FIG. 7 provides efficient multicasting with L2 multicast mode switches 408 regardless of the position of the decoder. This is again because group membership is spread throughout the layer 2 network. If a fault occurs and an alternative recovery path is established, then new group membership information is propagated on the new path.

Figure 8:
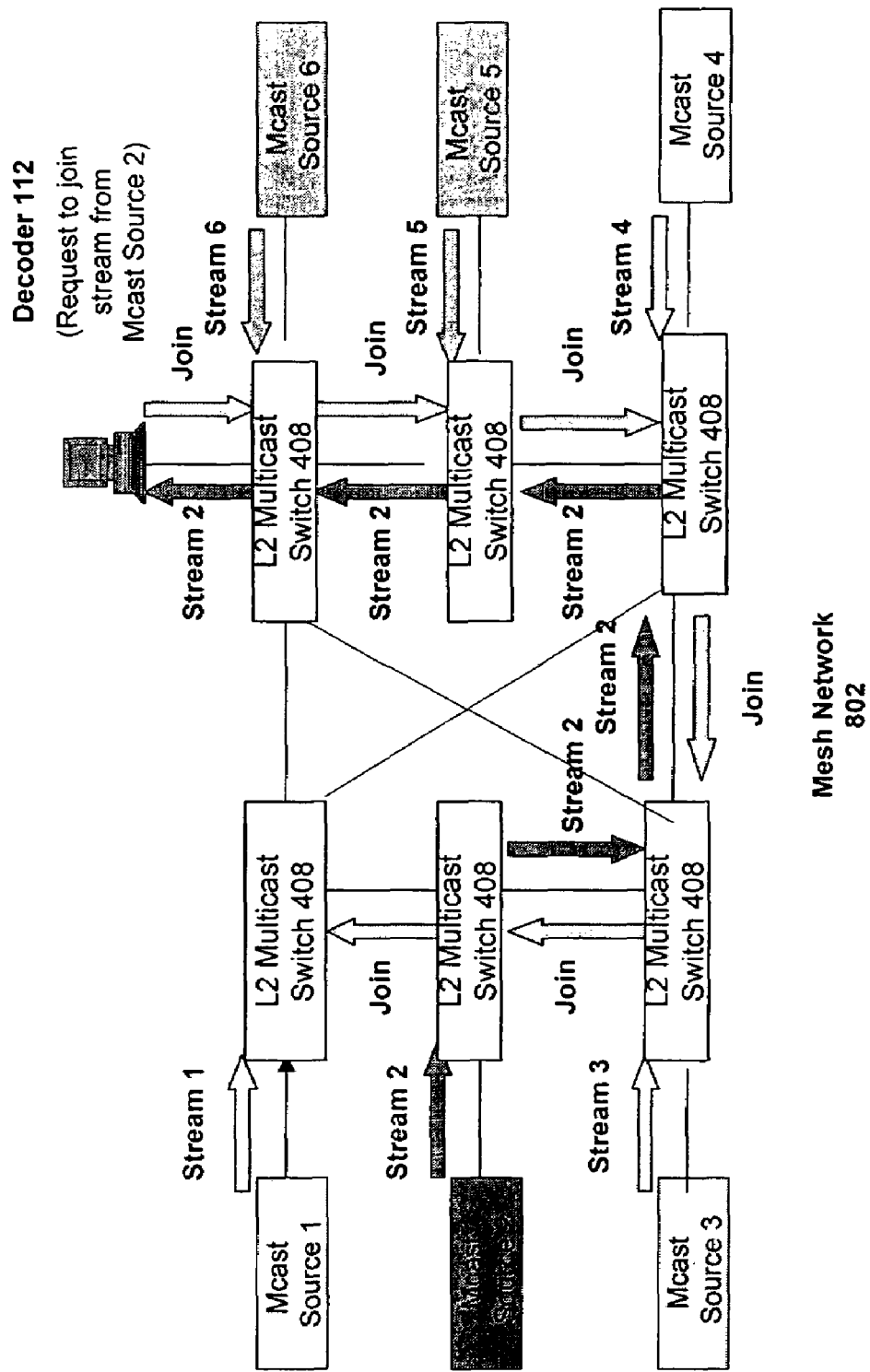
FIG. 8 depicts multicasting in a redundant mesh network including layer 2 switches operating in a L2 multicast mode in accordance with an embodiment of the invention.

FIG. 8 depicts multicasting in a redundant mesh network including layer 2 switches 408 operating in a L2 multicast mode in accordance with an embodiment of the invention. Similar to the ring network 702 of FIG. 7, the mesh network 802 of FIG. 8 provides efficient multicasting with L2 multicast mode switches 408 regardless of the position of the decoder. This is again because group membership is spread throughout the layer 2 network. If a fault occurs and an alternative recovery path is established, then new group membership information is propagated on the new path.

The above description discloses inventive and advantageous methods and apparatus for layer 2 multicast traffic management. This technology is being implemented in switch products by Garrettcom, Inc. of Fremont, Calif. While the above description provides a technique for layer 2 multicast traffic management using a query-response protocol such as IGMP, alternate techniques may also be utilized so as to provide layer 2 multicast traffic management.

A first alternate technique utilizes a peer-to-peer protocol to transfer group information between switches. A second alternate technique utilizes a discovery protocol where every switch broadcasts the group information to other switches. A third alternate technique uses a tracer protocol that tracks a special protocol packet throughout the network.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of implementing multicasting in a layer 2 network, the method comprising:
   snooping multicast protocol packets by multiple switches in the layer 2 network;
   generating query messages by each of the multiple switches; and
   forwarding join report messages by each of the multiple switches to all ports on which a querier is present.

2. The method of claim 1, further comprising forwarding a multicast packet only to ports belonging to a corresponding multicast group.

3. The method of claim 2, further comprising not automatically forwarding the multicast packet to ports on which a querier is present.

4. The method of claim 2, further comprising the multiple switches not forwarding query messages.

5. The method of claim 2, further comprising not automatically forwarding an leave message to ports on which a querier is present.

6. A switching apparatus configured to implement multicasting in a layer 2 network, the apparatus comprising:
   means for snooping multicast protocol packets;
   processor-executable instructions configured to generate query messages; and
   processor-executable instructions configured to forward join report messages to all ports on which a querier is present.

7. The apparatus of claim 6, further comprising processor-executable instructions configured to forward a multicast packet only to ports belonging to a corresponding multicast group.

8. The apparatus of claim 7, further comprising processor-executable instructions configured to not automatically forward the multicast packet to ports on which a querier is present.

9. The apparatus of claim 7, further comprising processor-executable instructions configured to not forward query messages.

10. The apparatus of claim 7, further comprising processor-executable instructions configured to not automatically forward an leave message to ports on which a querier is present.

11. A switching device configured to provide multicast traffic management in a layer 2 network without layer 3 devices, the device comprising:
   means for snooping multicast protocol packets;
   processor-executable instructions configured to generate query messages; and
   processor-executable instructions configured to forward join report messages to all ports on which a querier is present.

12. The switching device of claim 11, wherein multicast group information is transferred between the switching device and other switching devices in the layer 2 network by way of a peer-to-peer protocol.

13. The switching device of claim 11, wherein multicast group information communicated with other switching devices in the layer 2 network by way of a discovery protocol.

14. The switching device of claim 11, wherein multicast group information is determined by using a tracer protocol which tracks a special protocol packet throughout the layer 2 network.

* * * * *